United States Patent
Berger et al.

(10) Patent No.: US 11,057,850 B1
(45) Date of Patent: Jul. 6, 2021

(54) TRANSMIT POWER CONTROL FOR NULL DATA PACKETS

(71) Applicant: Marvell Asia Pte, Ltd., Singapore (SG)

(72) Inventors: Christian R. Berger, San Jose, CA (US); Niranjan Grandhe, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/898,243

(22) Filed: Jun. 10, 2020

Related U.S. Application Data

(60) Provisional application No. 62/859,553, filed on Jun. 10, 2019.

(51) Int. Cl.
| | |
|---|---|
| *H04W 4/02* | (2018.01) |
| *H04W 64/00* | (2009.01) |
| *H04W 24/10* | (2009.01) |
| *H04L 25/02* | (2006.01) |
| *H04L 12/26* | (2006.01) |
| *H04B 1/40* | (2015.01) |
| *H04W 52/54* | (2009.01) |
| *H04W 84/12* | (2009.01) |
| *H04B 7/0417* | (2017.01) |
| *H04W 84/18* | (2009.01) |

(52) U.S. Cl.
CPC .......... *H04W 52/54* (2013.01); *H04B 7/0417* (2013.01); *H04W 24/10* (2013.01); *H04W 64/003* (2013.01); *H04W 84/12* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 9,166,660 | B2 | 10/2015 | Chu et al. | |
| 9,585,043 | B2 * | 2/2017 | Grandhi | .................. H04W 4/06 |
| 9,832,792 | B2 * | 11/2017 | Ghosh | ............... H04W 74/0833 |
| 10,034,288 | B2 * | 7/2018 | Chun | .................. H04W 52/248 |
| 10,064,154 | B2 * | 8/2018 | Banin | ................... G01S 5/0284 |

(Continued)

OTHER PUBLICATIONS

IEEE P802.11ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

IEEE P802.11ax™/D5.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 772 pages (Oct. 2019).

(Continued)

*Primary Examiner* — Tuan A Tran

(57) ABSTRACT

A first communication device generates a frame that includes an indication of a transmit power corresponding to one or more null data packets (NDPs) separate from the frame to permit a second communication device to determine a pathloss between the first communication device and the second communication device based on a received power of the one or more NDPs at the second communication device. The first communication device transmits the frame as part of a ranging measurement exchange. As part of one or more ranging measurement exchanges, the first communication device transmits the one or more NDPs in accordance with the transmit power indicated in the frame.

20 Claims, 8 Drawing Sheets

(56) References Cited

U.S. PATENT DOCUMENTS

| | | | |
|---|---|---|---|
| 10,075,873 B2* | 9/2018 | Merlin | H04L 1/0027 |
| 10,104,635 B2* | 10/2018 | Malik | H04W 64/003 |
| 10,111,132 B2* | 10/2018 | Merlin | H04L 5/0057 |
| 10,178,673 B1* | 1/2019 | Jiang | H04L 5/0051 |
| 10,379,196 B2* | 8/2019 | Aldana | H04W 4/02 |
| 10,397,024 B2* | 8/2019 | Li | H04L 5/0091 |
| 10,491,327 B2* | 11/2019 | Herrmann | H04H 60/73 |
| 10,631,187 B1* | 4/2020 | Chu | H04W 24/10 |
| 10,667,237 B2* | 5/2020 | Seok | H04W 24/10 |
| 10,694,499 B2* | 6/2020 | Venkatesan | G01S 5/00 |
| 10,715,995 B2* | 7/2020 | Segev | H04L 5/0023 |
| 10,716,022 B2* | 7/2020 | Ganu | H04W 24/08 |
| 10,732,275 B2* | 8/2020 | Oh | G01S 13/74 |
| 10,856,167 B2* | 12/2020 | Zhu | H04W 56/004 |
| 10,880,855 B2* | 12/2020 | Chu | H04B 7/0636 |
| 2005/0026563 A1 | 2/2005 | Leeper et al. | |
| 2011/0261708 A1 | 10/2011 | Grandhi | |
| 2016/0323879 A1 | 11/2016 | Ghosh et al. | |
| 2018/0027561 A1 | 1/2018 | Segev et al. | |
| 2018/0310273 A1* | 10/2018 | Chu | G01S 5/0257 |
| 2019/0021106 A1* | 1/2019 | Oteri | H04L 1/0006 |
| 2019/0132762 A1* | 5/2019 | Zhu | H04W 24/08 |
| 2020/0068655 A1* | 2/2020 | Ghosh | H04L 5/0053 |
| 2020/0314220 A1* | 10/2020 | Segev | H04L 69/28 |

OTHER PUBLICATIONS

IEEE Standard P802.11az™/D2.2, "P802.11az™/D2.2, Draft Standard for Information technology—Telecommunications and information exchange between systems, Local and metropolitan area networks—Specific requirements, Part 11: Wireless LAN Medium Access Control (MAC) and Physical Layer (PHY) Specifications, Amendment 3: Enhancements for positioning," *Institute of Electrical and Electronics Engineers*, 242 pages (Apr. 2020).

IEEE Std 802.11-REVmc™/D8.0, Aug. 2016, "Draft Standard for Information technology—Telecommunications and information exchange between systems—Local and metropolitan area networks—Specific requirements Part 11: Wireless LAN Medium Access Control (MAC) and Physical Layer (PHY) Specifications," *The Institute of Electrical and Electronics Engineers, Inc.*, pp. i-civ, 291-294, 336-341, 387-389, 771-773, 819-821, 858-865, 901-903, 1062-1066, 1158-1161, 1552-1571, 1703-1707, 1740, 1741, 1765-1775, 2193, 2194, 3601, 3602 (Aug. 2016).

Zhu et al., "IEEE P802.11, Wireless LANs, Proposed 802.11az Functional Requirements," *Institute of Electrical and Electronics Engineers*, doc. IEEE 802.11-16/0424r4, 6 pages (Mar. 13, 2017).

* cited by examiner

TRANSMIT POWER CONTROL FOR NULL DATA PACKETS

CROSS REFERENCES TO RELATED APPLICATIONS

This application claims the benefit of U.S. Provisional Patent Application No. 62/859,553, entitled "Null Data Packet (NDP) Power Control for Error Vector Magnitude (EVM)," filed on Jun. 10, 2019, which is incorporated herein by reference in its entirety.

FIELD OF TECHNOLOGY

The present disclosure relates generally to wireless communication systems, and more particularly to determining distances between wireless devices in a wireless local area network (WLAN).

BACKGROUND

Wireless local area networks (WLANs) have evolved rapidly over the past two decades, and development of WLAN standards such as the Institute for Electrical and Electronics Engineers (IEEE) 802.11 Standard family has improved single-user peak data rates. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. The IEEE 802.11ax Standard provides even greater throughput, as well as improvements to range and 'battery' consumption.

Some mobile communication devices include a WLAN network interface and satellite positioning technology, such as global positioning system (GPS) technology. GPS technology in mobile communication devices is useful for navigating to a desired location, for example. However, GPS technology does not typically provide accurate location information when a GPS receiver is not in direct sight of a GPS satellite, and thus GPS technology is often not useful for providing location information while a mobile communication device is within a building (e.g., an airport, a shopping mall, etc.), within a tunnel, etc.

Techniques for determining a position of a communication device using WLAN technology are now under development. For example, a distance, or range, between a first communication and a second communication device is determined by measuring a time of flight of WLAN transmissions between the first communication device and the second communication device. Similarly, distances between the first communication device and multiple third communication devices are determined. Then, the determined distances are used to estimate a location of the first communication device by employing, for example, a triangulation technique.

Additionally, it is sometimes useful for WLAN devices to determine a distance, or range, between each other for purposes other than positioning. For example, when a WLAN device is nearby multiple access points (APs), it may be beneficial to associate with a nearest AP to maximize signal quality and throughput. As another example, it may be beneficial for an AP to group client stations according to distance from the AP for purposes of multi-user communications. For instance, when transmitting to a group of client stations that are similarly distanced from the AP, the AP can better optimize transmit power for signal quality/throughput and/or to mitigate interference with neighboring networks.

A current draft of the IEEE 802.11az Standard (sometimes referred to as Next Generation Positioning (NGP)), now under development, proposes to measure distances between devices by measuring times of flights of null data packets (NDPs). To improve time of arrival measurements, it is generally preferable to transmit an NDP using a relatively high transmit power so that a signal to interference plus noise ratio (SINR) of the NDP at a receiver is high. On the other hand, orthogonal frequency division multiplexing (OFDM) signals used in WLANs tend to have a relatively large peak-to-average power ratio (PAPR), which may cause a power amplifier in a transmitter to enter a non-linear region of operation when the transmit power is high. When the power amplifier operates in the non-linear region, the signal becomes distorted, which can be modeled as interference. Thus, at high transmit power, peaks of an NDP transmission may enter the non-linear region of the power amplifier resulting in distortion, which will lower the SINR at the receiver.

SUMMARY

In an embodiment, a method for performing ranging measurements in a wireless local area network (WLAN) includes: generating, at a first communication device, a frame that includes an indication of a transmit power corresponding to one or more null data packets (NDPs) separate from the frame to permit a second communication device to determine a pathloss between the first communication device and the second communication device based on a received power of the one or more NDPs at the second communication device, wherein each of the one or more NDPs includes a physical layer (PHY) header and omits a PHY data portion; transmitting, by the first communication device, the frame as part of a ranging measurement exchange; and as part of one or more ranging measurement exchanges, transmitting, by the first communication device, the one or more NDPs in accordance with the transmit power indicated in the frame.

In another embodiment, a first communication device comprises a wireless network interface device that is configured to communicate in a WLAN. The wireless network interface device includes one or more integrated circuit (IC) devices that are configured to: generate a frame that includes an indication of a transmit power corresponding to one or more NDPs separate from the frame to permit a second communication device to determine a pathloss between the first communication device and the second communication device based on a received power of the one or more NDPs at the second communication device, wherein each of the one or more NDPs includes a PHY header and omits a PHY data portion; control the wireless network interface device to transmit the frame as part of a ranging measurement exchange; and as part of one or more ranging measurement exchanges, control the wireless network interface device to transmit the one or more NDPs in accordance with the transmit power indicated in the frame.

In yet another embodiment, a method for performing ranging measurements in a WLAN includes: during a ranging measurement exchange, receiving, at a first communication device, a frame that includes one or more indications of at least one of i) a transmit power corresponding to one or more first NDPs transmitted by a second communication device, and ii) a receive power corresponding to one or more second. NDPs transmitted by the first communication device and received by the second communication device, wherein each of the one or more first NDPs and the one or more second NDPs includes a PHY header and omits a PHY data portion; calculating, at the first communication device, a pathloss between the first communication device and the second communication deice using the one or more indications of the at least one of i) the transmit power corresponding to one or more first NDPs, and ii) the receive power corresponding to one or more second NDPs; using the calculated pathloss, selecting, by the first communication device, a transmit power of a first NDP to be transmitted to the first communication device; and transmitting, by the first communication device, the first NDP at the selected transmit power as part of a ranging measurement exchange.

In still another embodiment, a first communication device comprises a wireless network interface device that is configured to communicate in a WLAN. The wireless network interface device includes one or more integrated circuit (IC) devices that are configured to: during a ranging measurement exchange, receive a frame that includes one or more indications of at least one of i) a transmit power corresponding to one or more first null data packets (NDPs) transmitted by a second communication device, and ii) a receive power corresponding to one or more second NDPs transmitted by the first communication device and received by the second communication device, wherein each of the one or more first NDPs and the one or more second NDPs includes a physical layer (PHY) header and omits a PHY data portion; calculate a pathloss between the first communication device and the second communication device using the one or more indications of the at least one of i) the transmit power corresponding to one or more first NDPs, and ii) the receive power corresponding to one or more second NDPs; using the calculated pathloss, select a transmit power of a first NDP to be transmitted to the first communication device; and control the wireless network interface device to transmit the first NDP at the selected transmit power as part of a ranging measurement exchange.

DETAILED DESCRIPTION

Various techniques described below allow a transmitter of a null data packet (NDP) to determine a pathloss from the transmitter to a receiver, according to various embodiments. Using the determined pathloss, the transmitter can adjust a transmit power of the NDP so that a signal to interference plus noise ratio (SINR) of the NDP at the receiver is more optimal, and thus measurements of the NDP made at the receiver are improved. For example, by knowing the pathloss, the transmitter can adjust the transmit power of the NDP so that received power of the NDP at the receiver is high while at the same time distortion (caused by a power amplifier of the transmitter operating in a non-linear range) is low enough so that SINR is not degraded, according to some embodiments.

In some embodiments described below, a first communication device transmits a packet before (or after) transmission of an NDP that indicates a transmit power that the first communication device will use (or did use) for transmitting the NDP. A second communication device measures a pathloss from the first communication device to the second communication device using a receive power of the NDP at the first communication device, and ii) the indicated transmit power in the packet transmitted before (or after) the NDP, according to some embodiments. The second communication feeds back an indication of the pathloss to the first communication device for use by the first communication device in setting a transmit power for a subsequent NDP transmitted to the second communication device, according to some embodiments. In some embodiments, the second communication device assumes that a pathloss from the second communication device to the first communication device is the same as the pathloss from the first communication device to the second communication device, and uses the determined pathloss from the first communication device to the second communication device in setting a transmit power for a subsequent NDP transmitted by the second communication device to the first communication device.

In an embodiment, an NDP includes a physical layer (PHY) header and omits a PHY data portion. In some embodiments, the PHY header includes one or more training signals that are used by receivers for signal detection, automatic gain control (AGC) adjustment, channel estimation, etc.

Figure 1:
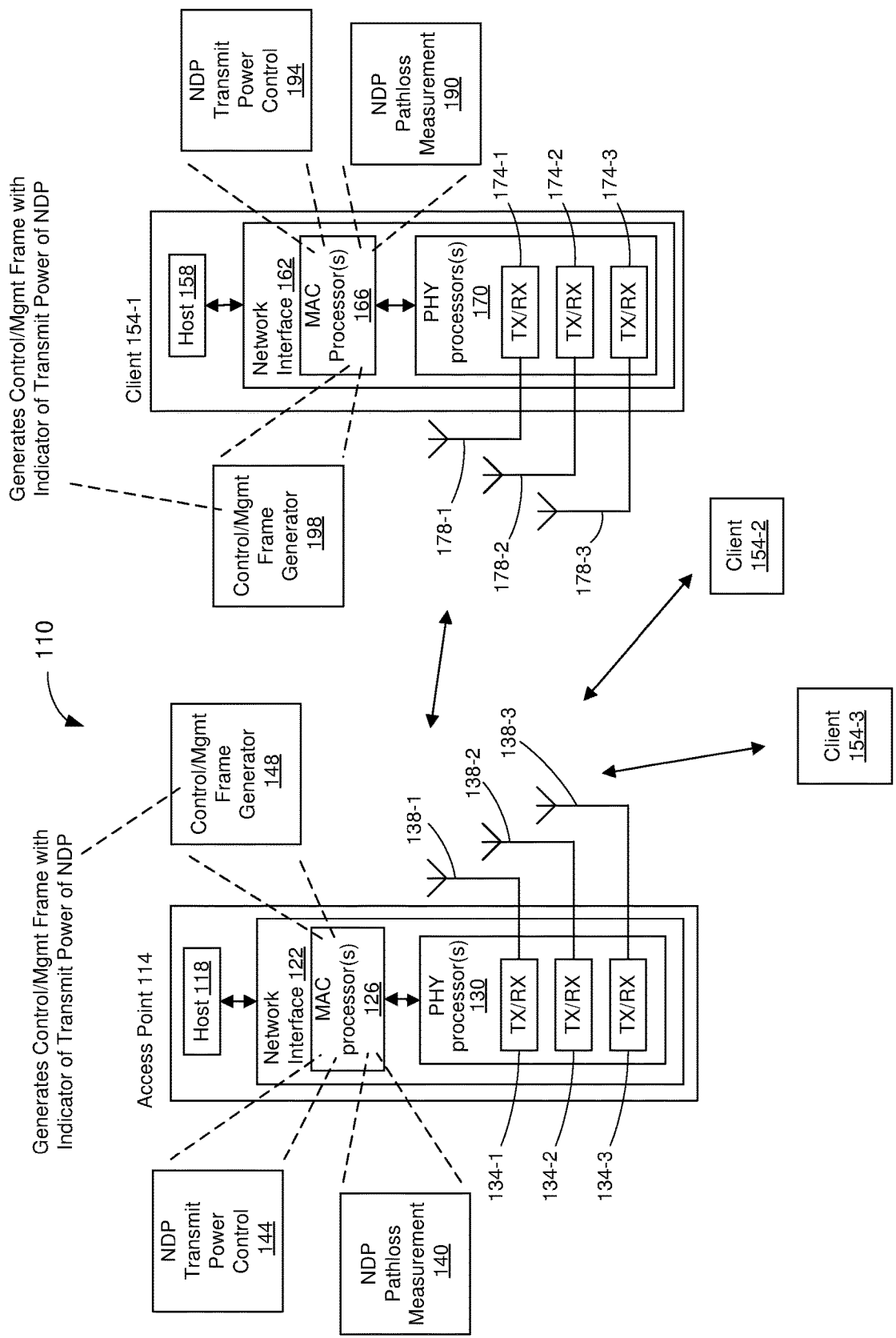
FIG. 1 is a block diagram of an example wireless local area network (WLAN) that uses transmit power control techniques for transmitting NDPs, according to an embodiment.

FIG. 1 is a diagram of an example WLAN 110 that uses transmit power control techniques for transmitting NDPs, according to an embodiment. Measuring times of flight of NDPs can be used for measuring distances between communication devices in the WLAN 110, according to some embodiments. In other embodiments, NDPs are transmitted additionally or alternatively for the purpose of making channel estimate measurements between communication devices in the WLAN 110. Using transmit power control techniques for transmitting NDPs improves distance measurements and/or channel estimate measurements, according to various embodiments.

The WLAN 110 includes an AP 114 that comprises a host processor 118 coupled to a wireless network interface device 122. The wireless network interface device 122 includes one or more medium access control (MAC) processors 126 (sometimes referred to herein as "the MAC processor 126" for brevity) and one or more PHY processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 comprises other suitable numbers of transceivers 134 and antennas 138 in other embodiments. In some embodiments, the AP 114 includes a higher number of antennas 138 than transceivers 134, and antenna switching techniques are utilized.

In an embodiment, the wireless network interface device 122 is configured for operation within a single RF band at a given time. In another embodiment, the wireless network interface device 122 is additionally configured for operation within two or more RF bands at the same time or at different times. In an embodiment, the wireless network interface device 122 includes multiple PHY processors 130, where respective PHY processors 130 correspond to respective RF bands. In another embodiment, the wireless network interface device 122 includes a single PHY processor 130, where each transceiver 134 includes respective RF radios corresponding to respective RF bands.

The wireless network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. The first IC and the second IC may be packaged together in a single IC package thereby forming a modular device, or the first IC and the second IC may be coupled together on a single printed circuit board (PCB), for example, or another suitable substrate, in various embodiments. As another example, at least a portion of the MAC processor 126 and at least a portion of the PHY processor 130 may be implemented on a single IC. For instance, the wireless network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the wireless network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 is configured to generate MAC layer data units such as MAC service data units (MSDUs), MAC protocol data units (MPDUs), etc., and provide the MAC layer data units to the PHY processor 130. Additionally, the MAC processor 126 is configured to select communication links via which MAC layer data units should be transmitted and to control the PHY processor 130 so that the MAC layer data units are transmitted in the selected communication links, in some embodiments. Also, the MAC processor 126 is configured to determine when the respective communication links are idle and available for transmission and to control the PHY processor 130 so that MAC layer data units are transmitted when respective communication links are idle, in some embodiments. Additionally, the MAC processor 126 is configured to determine when client stations are in a sleep state and therefore unavailable to transmit or receive, in some embodiments. For example, the MAC processor 126 is configured to negotiate a schedule with a client station for when the client station is permitted to be in the sleep state and when the client station should be in a wake state and available to transmit to or receive from the AP 114, according to some embodiments.

The PHY processor 130 may be configured to receive MAC layer data units from the MAC processor 126 and to encapsulate the MAC layer data units to generate PHY data units such as PHY protocol data units (PPDUs) for transmission via the antennas 138. Similarly, the PHY processor 130 may be configured to receive PHY data units that were received via the antennas 138, and to extract MAC layer data units encapsulated within the PHY data units. The PHY processor 130 may provide the extracted MAC layer data units to the MAC processor 126, which processes the MAC layer data units.

PHY data units are sometimes referred to herein as "packets", and MAC layer data units are sometimes referred to herein as "frames".

In connection with generating one or more RF signals for transmission, the PHY processor 130 is configured to process (which may include modulation, filtering, etc.) data corresponding to a PPM to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulation, filtering, etc.) the one or more digital baseband signals to generate a PPDU.

The PHY processor 130 includes amplifiers (e.g., a low noise amplifier (LNA), a power amplifier, etc.), an RF downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FIT) calculator), one or more inverse discrete Fourier transform (IDFT) calculators (e.g., an inverse fast Fourier transform (IFFT) calculator), one or more modulators, one or more demodulators, etc., in various embodiments.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals, for example, by providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In other embodiments, the MAC processor 126 additionally or alternatively includes one or more hardware state machines.

The MAC processor 126 includes, or implements, an NDP pathloss measurement calculator 140 that is configured to calculate a pathloss measurement in connection with an NDP, according to some embodiments. For example, the NDP pathloss measurement calculator 140 calculates the pathloss measurement using i) a receive power measurement of a received NDP and ii) a transmit power of the NDP, according to an embodiment. The receive power measurement of the received NDP is made by a power measurement circuit (not shown) of the PHY processor 130, according to an embodiment. As will be described in more detail below, the transmit power of the NDP is received in a packet (separate from the NDP) from the client station that transmits the NDP.

In an embodiment, the NDP pathloss measurement calculator 140 is implemented by a processor executing machine readable instructions stored in a memory, where the machine readable instructions cause the processor to calculate the pathloss measurement using i) the receive power measurement of the received NDP and ii) the transmit power of the NDP. In another embodiment, the NDP pathloss measurement calculator 140 comprises hardware circuitry that is configured to calculate the pathloss measurement.

In another embodiment, the PHY processor 130 includes, or implements, the NDP pathloss measurement calculator 140.

The MAC processor 126 also includes, or implements, an NDP transmit power controller 144 that is configured to select a transmit power to use when the network interface device 122 transmits an NDP, according to some embodiments. In an embodiment, the NDP transmit power controller 144 selects the transmit power using a pathloss measurement generated by the NDP pathloss measurement generator 140.

In an embodiment, the NDP transmit power controller 144 is implemented by a processor executing machine readable instructions stored in a memory, where the machine readable instructions cause the processor to select the transmit power for an NDP, In another embodiment, the NDP transmit power controller 144 comprises hardware circuitry that is configured to select the transmit power of the NDP.

In another embodiment, the PHY processor 130 includes, or implements, the NDP transmit power controller 144.

The MAC processor 126 also includes, or implements, a control and/or management (control/management) frame generator 148 that is configured to generate a control frame or a management frame that includes an indicator of a transmit power for an NDP that the network interface 122 transmitted (or will transmit), according to some embodiments. In an embodiment, the MAC processor 126 controls the PHY processor 130 to transmit the frame generated by the control/management frame generator 148 in a packet after, or prior to, transmitting the NDP. In an embodiment, the control/management frame generator 148 receives the indicator of the transmit power for the NDP from the NDP transmit power controller 144.

In an embodiment, the control/management frame generator 148 is implemented by a processor executing machine readable instructions stored in a memory, where the machine readable instructions cause the processor to generate the control frame or the management frame that includes the indicator of the transmit power for the NDP. In another embodiment, the control/management frame generator 148 comprises hardware circuitry that is configured to generate the control frame or the management frame that includes the indicator of the transmit power for the NDP.

The WEAN 110 also includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a wireless network interface device 162. The wireless network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

In an embodiment, the wireless network interface device 162 is configured for operation within a single RF band at a given time. In another embodiment, the wireless network interface device 162 is configured for operation within two or more RF bands at the same time or at different times. For example, in an embodiment, the wireless network interface device 162 includes multiple PHY processors 170, where respective PHY processors 170 correspond to respective RF bands. In another embodiment, the wireless network interface device 162 includes a single PHY processor 170, where each transceiver 174 includes respective RF radios corresponding to respective RF bands. In an embodiment, the wireless network interface device 162 includes multiple MAC processors 166, where respective MAC processors 166 correspond to respective RF bands. In another embodiment, the wireless network interface device 162 includes a single MAC processor 166 corresponding to the multiple RF bands.

The wireless network interface device 162 is implemented using one or more ICs configured to operate as discussed below. For example, the MAC processor 166 may be implemented on at least a first IC, and the PHY processor 170 may be implemented on at least a second IC. The first IC and the second IC may be packaged together in a single IC package thereby forming a modular device, or the first IC and the second IC may be coupled together on a single PCB, for example, or another suitable substrate, in various embodiments. As another example, at least a portion of the MAC processor 166 and at least a portion of the PHY processor 170 may be implemented on a single IC. For instance, the wireless network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the wireless network interface device 162 may be implemented on a single IC.

In various embodiments, the MAC processor 166 and the PHY processor 170 of the client station 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. Additionally, the MAC processor 166 is configured to select communication links via which MAC layer data units should be transmitted and to control the PHY processor 170 so that the MAC layer data units are transmitted in the selected communication links, in some embodiments. Also, the MAC processor 166 is configured to determine when the respective communication links are idle and available for transmission and to control the PHY processor 170 so that MAC layer data units are transmitted when respective communication links are idle, in some embodiments. Additionally, the MAC processor 166 is configured to control when portions of the wireless network interface device 162 are in a sleep state or a wake state, for example to conserve power, in some embodiments. For example, the MAC processor 166 is configured to negotiate a schedule with the AP 114 for when the client station 154-1 is permitted to be in the sleep state and when the client station 154-1 should be in a wake state and available to transmit to or receive from the AP 114, according to some embodiments.

The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more INT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In an embodiment, each of the client stations 154-2 and 154-3 has a structure that is the same as or similar to the client station 154-1. In an embodiment, one or more of the client stations 154-2 and 154-3 has a different suitable structure than the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

The MAC processor 166 includes, or implements, an NDP pathloss measurement calculator 190 that is configured to calculate a pathloss measurement in connection with an NDP, according to some embodiments. For example, the NDP pathloss measurement calculator 190 calculates the pathloss measurement using i) a receive power measurement of a received NDP and ii) a transmit power of the NDP, according to an embodiment. The receive power measurement of the received NDP is made by a power measurement circuit (not shown) of the PHY processor 170, according to an embodiment. As will be described in more detail below, the transmit power of the NDP is received in a packet (separate from the NDP) from the AP 114 that transmits the NDP.

In an embodiment, the NDP pathloss measurement calculator 190 is implemented by a processor executing machine readable instructions stored in a memory, where the machine readable instructions cause the processor to calculate the pathloss measurement using i) the receive power measurement of the received NDP and ii) the transmit power of the NDP. In another embodiment, the NDP pathloss measurement calculator 190 comprises hardware circuitry that is configured to calculate the pathloss measurement.

In another embodiment, the PHY processor 170 includes, or implements, the NDP pathloss measurement calculator 190.

The MAC processor 166 also includes, or implements, an NDP transmit power controller 194 that is configured to select a transmit power to use when the network interface device 162 transmits an NDP, according to some embodiments. In an embodiment, the NDP transmit power controller 194 selects the transmit power using a pathloss measurement generated by the NDP pathloss measurement generator 190.

In an embodiment, the NDP transmit power controller 194 is implemented by a processor executing machine readable instructions stored in a memory, where the machine readable instructions cause the processor to select the transmit power for an NDP, In another embodiment, the NDP transmit power controller 194 comprises hardware circuitry that is configured to select the transmit power of the NDP.

In another embodiment, the PHY processor 170 includes, or implements, the NDP transmit power controller 194.

The MAC processor 166 also includes, or implements, a control/management frame generator 198 that is configured to generate a control frame or a management frame that includes an indicator of a transmit power for an NDP that the network interface 162 transmitted (or will transmit), according to some embodiments. In an embodiment, the MAC processor 166 controls the PHY processor 170 to transmit the frame generated by the control/management frame generator 198 in a packet after, or prior to, transmitting the NDP. In an embodiment, the control/management frame generator 198 receives the indicator of the transmit power for the NDP from the NDP transmit power controller 194.

In an embodiment, the control/management frame generator 198 is implemented by a processor executing machine readable instructions stored in a memory, where the machine readable instructions cause the processor to generate the control frame or the management frame that includes the indicator of the transmit power for the NDP. In another embodiment, the control/management frame generator 198 comprises hardware circuitry that is configured to generate the control frame or the management frame that includes the indicator of the transmit power for the NDP.

Figure 2:
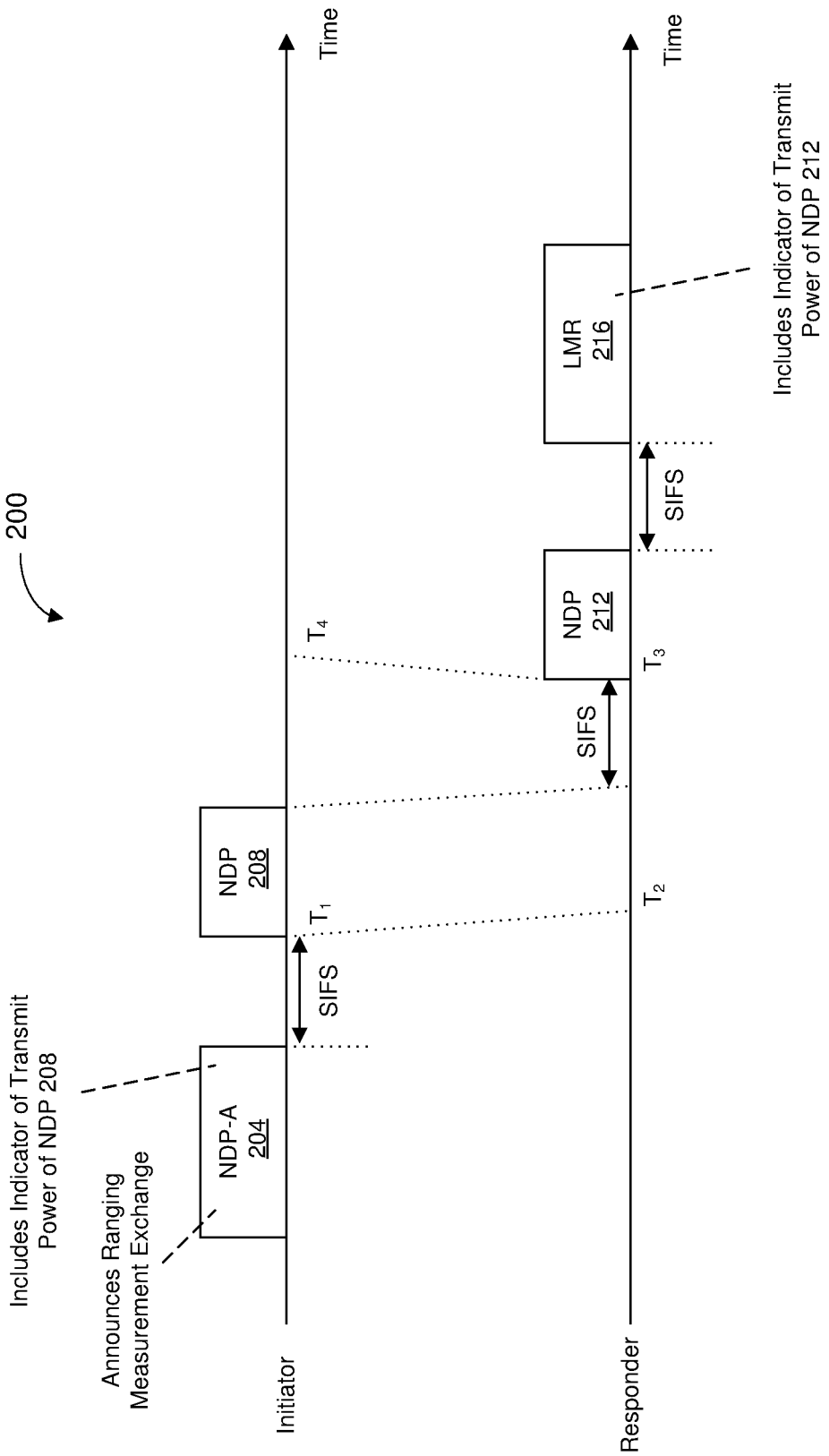
FIG. 2 is a diagram of an example ranging measurement exchange in which communication devices exchange information for calculating a pathloss between the communication devices, according to an embodiment.

FIG. 2 is a diagram of an example ranging measurement exchange 200, according to an embodiment. In the ranging measurement exchange 200, an initiator device (initiator) and a responding device (responder) exchange NDPs for the purpose of measuring times of flight between the initiator and the responder, which can be used to estimate a distance between the initiator and the responder. In some embodiments, multiple instances of the ranging measurement exchange 200 are performed, and multiple measurements and/or distance estimates are combined (e.g., averaged) to determine an estimate of the distance between the initiator and the responder.

In some embodiments, the initiator is the client station 154-1 and the responder is the AP 114, and FIG. 1 is described in this context for explanatory purposes. In other embodiments, the initiator is the AP 114 and the responder is the client station 154-1. In other embodiments, the initiator and the responder are both client stations 154. In other embodiments, the initiator and/or the responder are other suitable wireless communication devices.

The initiator transmits (e.g., the network interface device 162 transmits) an NDP announcement (NDP-A) frame 204. In an embodiment, the NDP-A frame 204 announces a ranging measurement exchange that includes the sequence of transmissions illustrated in FIG. 2. For example, transmission of the NDP-A frame 204 announces that the initiator will transmit an NDP 208 subsequent to the NDP-A frame 204, and alerts the responder that the responder is to transmit an NDP 212 subsequent to the NDP 208, and to transmit a frame 216 subsequent to the NDP 212, the frame 216 including ranging measurement information.

The initiator selects (e.g., the network interface device 162 selects) a transmit power to use when transmitting the NDP 208. The NDP-A frame 204 is generated to include an indicator of the transmit power that the initiator will use when transmitting the NDP 208.

The NDP-A frame 204 is transmitted within a PHY data unit (not shown). A predetermined time period after an end of transmitting the packet in which the NDP-A frame 204 is included, the initiator begins transmitting (e.g., the network interface device 162 begins transmitting) the NDP 208 at the selected transmit power. In an embodiment, the predetermined time period is a short interframe space (SIFS) as defined by the IEEE 802.11 Standard. In other embodiments, the predetermined time period is another suitable time period different than SIFS. In some embodiments, the predetermined time period is selected to prevent (or significantly reduce the chance of) another nearby communication device from inadvertently determining that the channel is idle in between packets in the ranging measurement exchange 200 and then transmitting a packet that interferes with the ranging measurement exchange 200.

The initiator records (e.g., the network interface device 162 records) a time of departure ($T_1$) of the NDP 208, which is used subsequently to calculate an estimate of a distance between the initiator and the responder (as will be described in more detail below).

The responder receives the NDP 208 and records (e.g., the network interface device 122 records) a time of arrival ($T_2$) of the NDP 208, which is used subsequently to calculate the estimate of the distance between the initiator and the responder. Additionally, the responder measures (e.g., the network interface device 122 measures) a receive power of the NDP 208 at the responder and records (e.g., the network interface device 122 records) an indicator of the receive power (e.g., a received signal strength indicator (RSSI)) for the NDP 208.

The responder uses the indicator of the transmit power of the NDP 208 (included in the NDP-A frame 204) and the indicator of the receive power of the NDP 208 to calculate a pathloss between the initiator and the responder (e.g., pathloss=transmit power of NDP−receive power of NDP).

In another embodiment, the initiator generates (e.g., the network interface device 162 generates, etc.) the frame 204 to include an indicator of a receive power (e.g., an RSSI) of a previous NDP (not shown) transmitted by the responder. Upon receiving the frame 204, the responder uses an indicator of a transmit power of the previously transmitted NDP (which was recorded by the transponder) and the indicator of the receive power of the NDP (included in the frame 204) to calculate a pathloss between the initiator and the responder (e.g., pathloss=transmit power of NDP−receive power of NDP).

The responder selects (e.g., the network interface device 122 selects) a transmit power to use when transmitting the NDP 212. In an embodiment, the responder uses the calculated pathloss to select the transmit power of the NDP 212. In another embodiment, the responder uses the calculated pathloss to select a transmit power of a subsequent NDP (not shown) in a subsequent ranging measurement exchange (not shown).

A predetermined time period after an end of reception of the NDP 208, the responder begins transmitting (e.g., the network interface device 122 begins transmitting) the NDP 212 at the selected transmit power. In an embodiment, the predetermined time period is SIFS as defined by the IEEE 802.11 Standard. The initiator records (e.g., the network interface device 122 records) a time of departure ($T_3$) of the NDP 212, which is used subsequently to calculate the estimate of the distance between the initiator and the responder.

The initiator receives the NDP 212 and records (e.g., the network interface device 162 records) a time of arrival ($T_4$) of the NDP 212, which is used subsequently to calculate the estimate of the distance between the initiator and the responder, Additionally, the initiator measures (e.g., the network interface device 162 measures) a receive power of the NDP 212 at the initiator and records (e.g., the network interface device 162 records) an indicator of the receive power (e.g., an RSSI) for the NDP 212.

A predetermined time period after an end of transmission of the NDP 212, the responder begins transmitting (e.g., the network interface device 122 begins transmitting) the frame 216. In an embodiment, the predetermined time period is SIFS as defined by the IEEE 802.11 Standard. In other embodiments, the predetermined time period is another suitable time period different than SIFS.

The frame 216 includes ranging measurement information corresponding to the ranging measurement exchange 200, according to an embodiment. For example, the frame 216 includes an indicator of the time $T_2$ and an indicator of the time $T_3$. Additionally, the responder generates (e.g., the network interface device 122 generates, etc.) the frame 216 to include an indicator of the transmit power that the responder used to transmit the NDP 212.

The initiator receives the frame 216 and uses the times $T_1$, $T_2$, $T_3$, and $T_4$ to calculate a round trip time between the initiator and the responder, according to an embodiment. The initiator receives uses the round trip time to calculate a distance between the initiator and the responder, according to an embodiment.

Additionally, the initiator uses the indicator of the transmit power of the NDP 212 (included in the frame 216) and the indicator of the receive power of the NDP 212 to calculate a pathloss between the initiator and the responder (e.g., pathloss=transmit power of NDP−receive power of NDP). The initiator selects (e.g., the network interface device 162 selects) a transmit power to use when transmitting a subsequent NDP (not shown) in a subsequent ranging measurement exchange (not shown).

Figure 3:
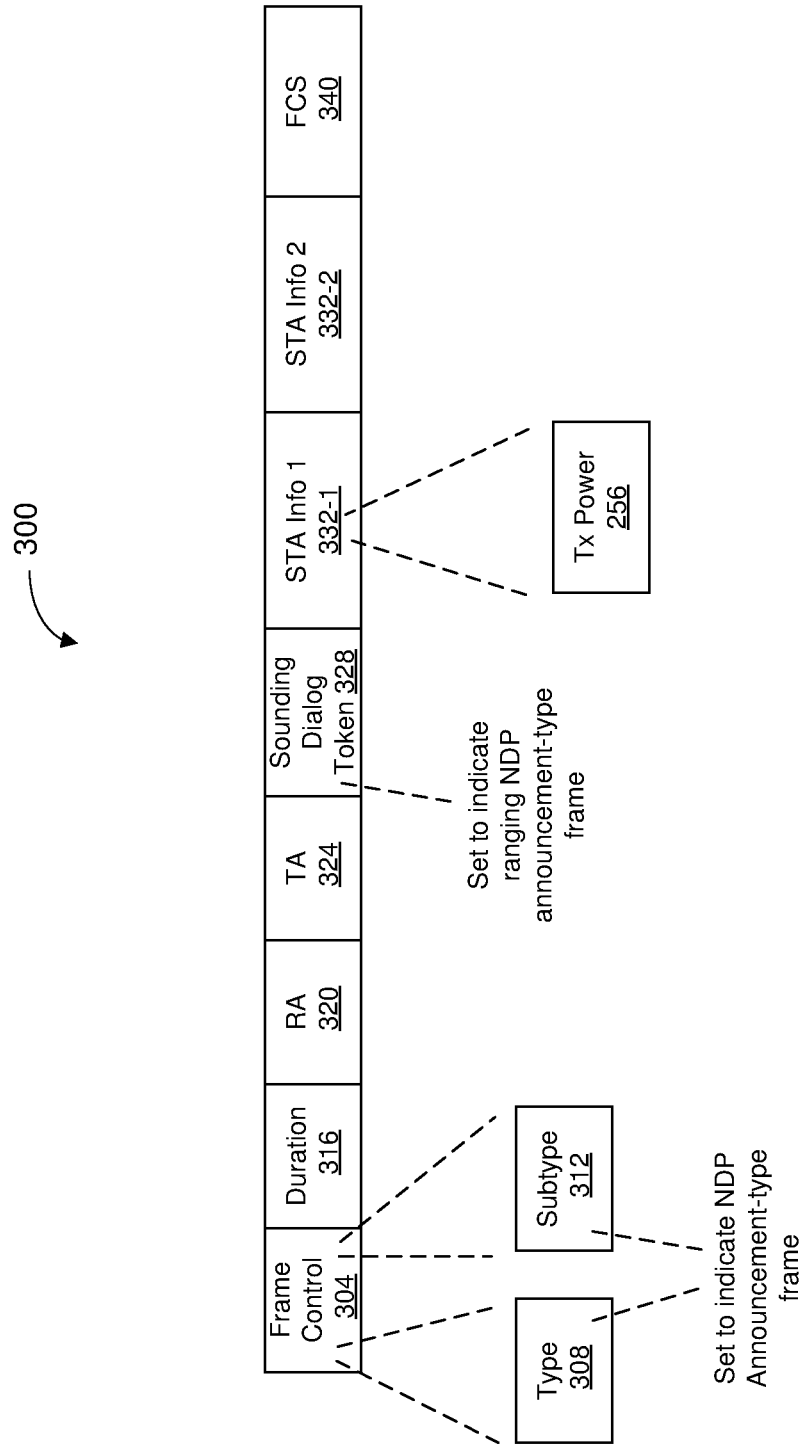
FIG. 3 is a diagram of an example null data packet (NDP) announcement frame used in the ranging measurement exchange of FIG. 2, according to an embodiment.

In another embodiment, the responder generates (e.g., the network interface device 122 generates, etc.) the frame 216 to include an indicator of the receive power (e.g., the RSSI) of the NDP 208 at the responder. Upon receiving the frame 216, the initiator uses the indicator of the transmit power of the NDP 208 and the indicator of the receive power of the NDP 208 (included in the frame 216) to calculate a pathloss between the initiator and the responder (e.g., pathloss=transmit power of NDP−receive power of NDP), FIG. 3 is a diagram of an example NDP announcement frame 300 that is used as the NDP announcement frame 204 of FIG. 2, according to an embodiment. The NDP announcement frame 204 of FIG. 2 has another suitable format in other embodiments. The network interface device 162 of the client station 154-1 (FIG. 1) is configured to generate and transmit the NDP announcement frame 300 as part of a ranging measurement exchange with the AP 114, according to an embodiment. For instance, the MAC processor 166 is configured to (e.g., the control/management frame generator 198 is configured to, etc.) generate and control the PHY processor 170 to transmit the NDP announcement frame 300, according to an embodiment. In other embodiments, the NDP announcement frame 300 is generated and transmitted in other suitable wireless communication networks and/or generated/transmitted/processed by other suitable wireless communication devices.

A frame control field 304 includes a type subfield 308 and a subtype subfield 312, The type subfield 308 and the subtype subfield 312 are set to indicate that the frame 300 is an NDP announcement frame having a particular format, such as the format illustrated in FIG. 3, according to an embodiment.

A duration field 316 is set to indicate a duration that encompasses the frame exchange 200 or another suitable frame exchange for ranging measurements, according to an embodiment. A receiver address (RA) field is set to a network address of the responder, and a transmitter address (TA) field is set to a network address of the initiator, according to an embodiment.

A sounding dialog token field 326 is set to indicate the NDP announcement frame 300 is for ranging measurements, and to indicate a particular ranging measurement exchange within a set of multiple ranging measurement exchanges (e.g., respective sounding dialog token numbers indicate respective ranging measurement exchanges).

The NDP announcement frame 300 also includes one or more station information fields 332. In an embodiment, the station information fields 332 have a particular format specific to ranging measurements and thus, when the sounding dialog token field 326 is set to indicate the NDP announcement frame 300 is for ranging measurements, a receiver assumes the format of the one or more station information fields 332 is the particular format specific to ranging measurements.

In an embodiment, the station information field 332-1 includes a shortened network address subfield (not shown) set to a value corresponding to the responder to indicate that the station information field 332-1 includes information for the responder. In an embodiment, the station information field 332-1 includes information regarding the NDP 208 and the NDP 212 (FIG. 2) that will be transmitted as part of the ranging measurement exchange, such as information regarding respective formats of the NDPs, according to an embodiment.

In an embodiment, the station information field 332-1 also includes an indicator of a transmit power of the NDP 208 that the initiator will transmit subsequent to the NDP announcement frame 300. For example, the station information field 332-1 includes an offset subfield (not shown) and the indicator of the transmit power of the NDP 208 is included in the offset subfield. In an embodiment, the offset subfield includes NDP format information useful for another type of ranging measurement exchange (such as a trigger-based ranging measurement exchange described below) and which is not relevant for the ranging measurement exchange 200 of FIG. 2, and thus the offset field can be populated with the indicator of the transmit power of the NDP 208 for the ranging measurement exchange 200 of FIG. 2. In another embodiment, the indicator of the transmit power of the NDP 208 is included in another suitable field within the station information field 332-1.

In another embodiment, the indicator of the transmit power of the NDP 208 is included in the station information field 332-2. For example, a shortened network address subfield (not shown) in the station information field 332-2 set to a particular value that is reserved for specifying that the station information field 332-2 has a particular format that includes a subfield for including the indicator of the transmit power of the NDP 208.

The NDP announcement frame 300 also includes a frame check sequence (FCS) field 372 that comprises error detection information (e.g., cyclic redundancy check (CRC) information) corresponding to other fields of the NDP announcement frame 300, according to an embodiment.

In other embodiments, instead of, or in addition to, including the indicator of the transmit power of the NDP 208 in the NDP announcement frame 300, the NDP announcement frame 300 includes an indicator of an average transmit power of a plurality of previous NDPs transmitted by the initiator during previous ranging measurement exchanges and optionally the NDP 208.

In other embodiments, instead of, or in addition to, including the indicator of the transmit power of the NDP 208 in the NDP announcement frame 300, the NDP announcement frame 300 includes an indicator of a receive power (e.g., an RSSI) of a previous NDP received by the initiator during a previous ranging measurement exchange. In an embodiment, the NDP announcement frame 300 also includes an indicator of the previous ranging measurement exchange (e.g., a sounding dialog token number) to which the indicator of the receive power (e.g., the RSSI) corresponds. In an embodiment, the indicator of the receive power (e.g., the RSSI) of the previous NDP is included in the station information field 3324 (e.g., in the offset subfield or another suitable subfield). In another embodiment, the indicator of the receive power (e.g., the RSSI) of the previous NDP is included in the station information field 332-2 and the shortened network address subfield (not shown) in the station information field 332-2 is set to a particular value that is reserved for specifying that the station information field 332-2 has a particular format that includes a subfield for including the indicator of the receive power of the previous NDP. In other embodiments, instead of, or in addition to, including the indicator of the transmit power of the NDP 208 in the NDP announcement frame 300, the NDP announcement frame 300 includes an indicator of an average receive power (e.g., an average RSSI) of a plurality of previous NDPs received by the initiator during a plurality of previous ranging measurement exchanges.

In other embodiments, instead of, or in addition to, including the indicator of the transmit power of the NDP 208 (and optionally the indicator of the receive power (e.g., the RSSI) of the previous NDP) in the NDP announcement frame 300, the NDP announcement frame 300 includes an indicator of a pathloss calculated by the initiator based on a previous NDP transmitted by, or received by, the initiator during a previous ranging measurement exchange. In an embodiment, the NDP announcement frame 300 also includes an indicator of the previous ranging measurement exchange (e.g., a sounding dialog token number) to which the indicator of the pathloss corresponds. In other embodiments, instead of, or in addition to, including the indicator of the transmit power of the NDP 208 in the NDP announcement frame 300, the NDP announcement frame 300 includes an indicator of an average pathloss calculated by the initiator based on a plurality of previous NDPs transmitted by, or received by, the initiator during a plurality of previous ranging measurement exchanges.

Figure 4:
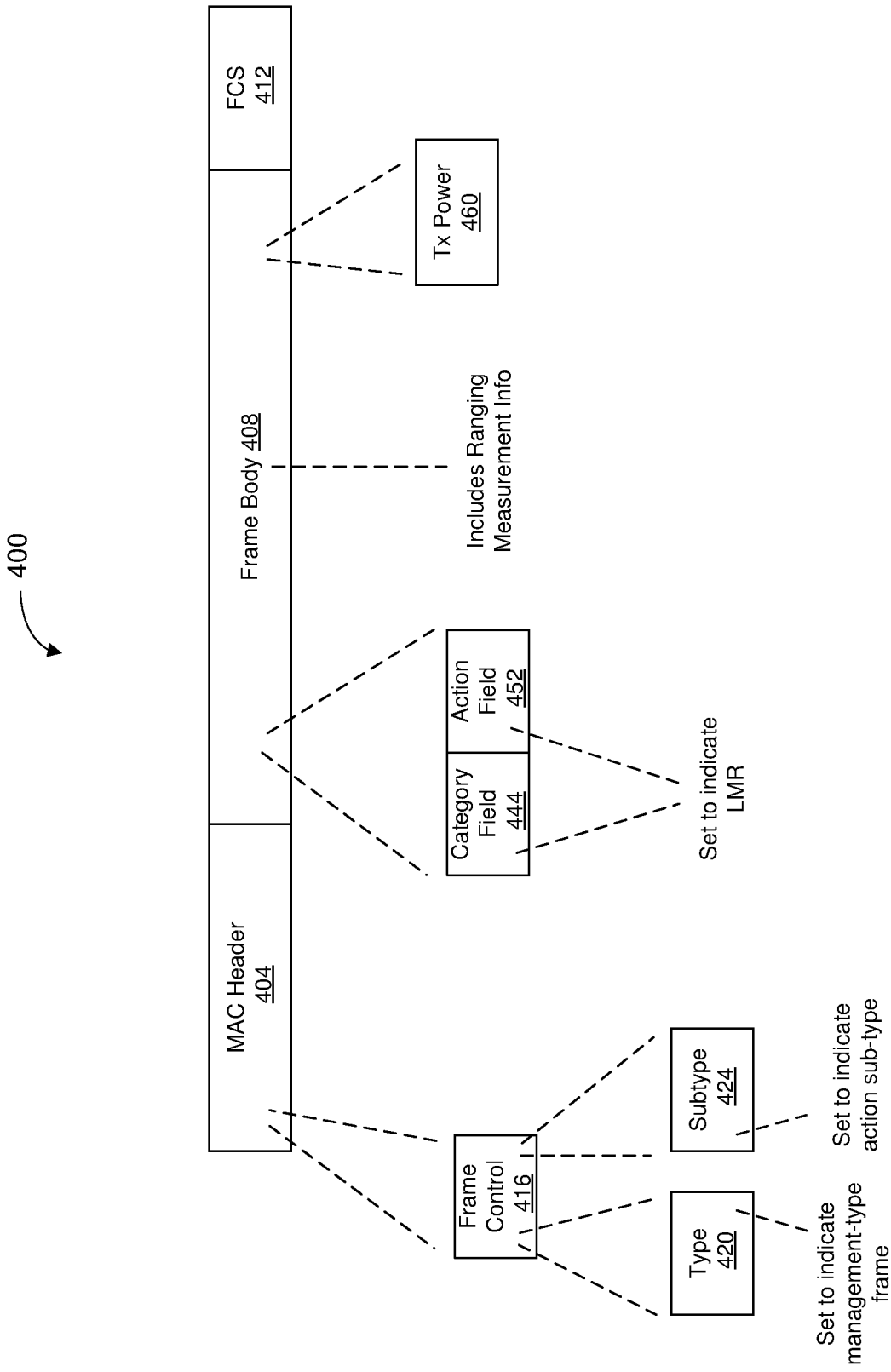
FIG. 4 is a diagram of an example ranging measurement feedback frame used in the ranging measurement exchange of FIG. 2, according to an embodiment.

FIG. 4 is a diagram of an example location management report (LMR) frame 400 that is used as the frame 216 of FIG. 2, according to an embodiment. The frame 216 of FIG. 2 has another suitable format in other embodiments. The network interface device 122 of the AP 114 (FIG. 1) is configured to generate and transmit the LMR frame 400 as part of a ranging measurement exchange with the AP 114, according to an embodiment. For instance, the MAC processor 126 is configured to (e.g., the control/management frame generator 148 is configured to, etc.) generate and control the PHY processor 130 to transmit the LMR frame 400, according to an embodiment. In other embodiments, the LMR frame 400 is generated and transmitted in other suitable wireless communication networks and/or generated/transmitted/processed by other suitable wireless communication devices.

The LMR frame 400 includes a MAC header 404, a frame body 408, and an FCS field 412, according to an embodiment. The FCS field 412 includes error detection information (e.g., CRC information) corresponding to the MAC header 404 and the frame body 408, according to an embodiment.

The MAC header 404 includes a frame control field 416 having MAC layer information regarding the management frame 400. The frame control field 416 includes a type subfield 420 and a subtype subfield 424 set to indicate the frame 400 is an action-type frame. As a result of setting the type subfield 420 and the subtype subfield 424 to indicate an action-type frame, receivers will assume the frame body 408 will have a format of an action-type frame when processing the frame 400. For example, the receivers will assume that the frame body 408 includes a category field 444.

The category field 444 is set to value that indicates that the frame body 408 also includes an action field 452. The action field 452 is set to a value that indicates that the frame 400 is an LMR-type frame, which indicates to receiver devices that the frame body 408 has a particular format corresponding to LMR-type frames.

The frame body 408 includes ranging measurement information such as a time or arrival and/or time of departure information regarding NDPs.

The frame body 408 also includes a transmit power field 460 that indicates a transmit power of the NDP 212, according to an embodiment. In another embodiment, the transmit power field 460 indicates an average transmit power of a plurality of NDPs previously transmitted by the responder and optionally the NDP 212, according to an embodiment.

In other embodiments, instead of, or in addition to, including the indicator of the transmit power of the NDP 212 in the LMR frame 400, the LMR frame 400 includes an indicator of a receive power (e.g., an RSSI) of the NDP 208 or a previous NDP received by the responder during a previous ranging measurement exchange. In an embodiment, the LMR frame 400 also includes an indicator of the previous ranging measurement exchange (e.g., a sounding dialog token number) to which the indicator of the receive power (e.g., the RSSI) corresponds. In another embodiment, LMR frame 400 includes an indicator of an average receive power (e.g., an average RSSI) of a plurality of NDPs previously received by the responder during a plurality of previous ranging measurement exchanges and optionally the NDP 208.

In other embodiments, instead of, or in addition to, including the indicator of the transmit power of the NDP 212 (and optionally the indicator of the receive power (e.g., the RSSI) of the previous NDP) in the LMR frame 400, the LMR frame 400 includes an indicator of a pathloss calculated by the responder based on a previous NDP transmitted by, or received by, the responder during a previous ranging measurement exchange. In an embodiment, the LMR frame 400 also includes an indicator of the previous ranging measurement exchange (e.g., a sounding dialog token number) to which the indicator of the pathloss corresponds. In other embodiments, instead of, or in addition to, including the indicator of the transmit power of the NDP 212 in the LMR 400 frame, the LMR frame 400 includes an indicator of an average pathloss calculated by the responder based on a plurality of previous NDPs transmitted by, or received by the responder during a plurality of previous ranging measurement exchanges.

Referring now to FIGS. 3 and 4, in some embodiments, transmit power of an NDP (or an average transmit power of a plurality of NDPs) in the NDP announcement frame 300 and/or the LMR frame 400 is indicated by a six-bit wide value. As merely an illustrative example, the six-bit wide value can be set to values in the range [0, 60], which correspond to transmit power values in the range [−20 dBm, 40 dBm], respectively, with a resolution of 1 dB. In other embodiments, the transmit power is represented using less than six bits or more than six bits. In other embodiments, the indicated transmit power is in another suitable range larger or smaller than [−20 dBm, 40 dBm] and/or with a suitable resolution less than or more than 1 dB. In an embodiment, the transmit power indication corresponds to a combined average power per 20 MHz bandwidth referenced to an antenna connector, of all antennas used to transmit the NDP.

In some embodiments, the NDP announcement frame 300 and/or the LMR frame 400 are modified to further include information that indicates a request for another communication device to adjust a transmit power of a next NDP to be transmitted by the other communication device. For example, the NDP announcement frame 300 is modified to further include information that indicates a request by the initiator for the responder to adjust a transmit power (e.g., increase power by a predefined amount, decrease power by the predefined amount, increase power by an amount also indicated in the NDP announcement frame 300, decrease power by an amount also indicated in the NDP announcement frame 300, etc.) of a next NDP to be transmitted by the responder, according to some embodiments. As another example, the LMR frame 400 is modified to further include information that indicates a request by the responder for the initiator to adjust a transmit power (e.g., increase power by a predefined amount, decrease power by the predefined amount, increase power by an amount also indicated in the NDP announcement frame 300, decrease power by an amount also indicated in the NDP announcement frame 300, etc.) of a next NDP to be transmitted by the initiator, according to some embodiments.

Figure 5:
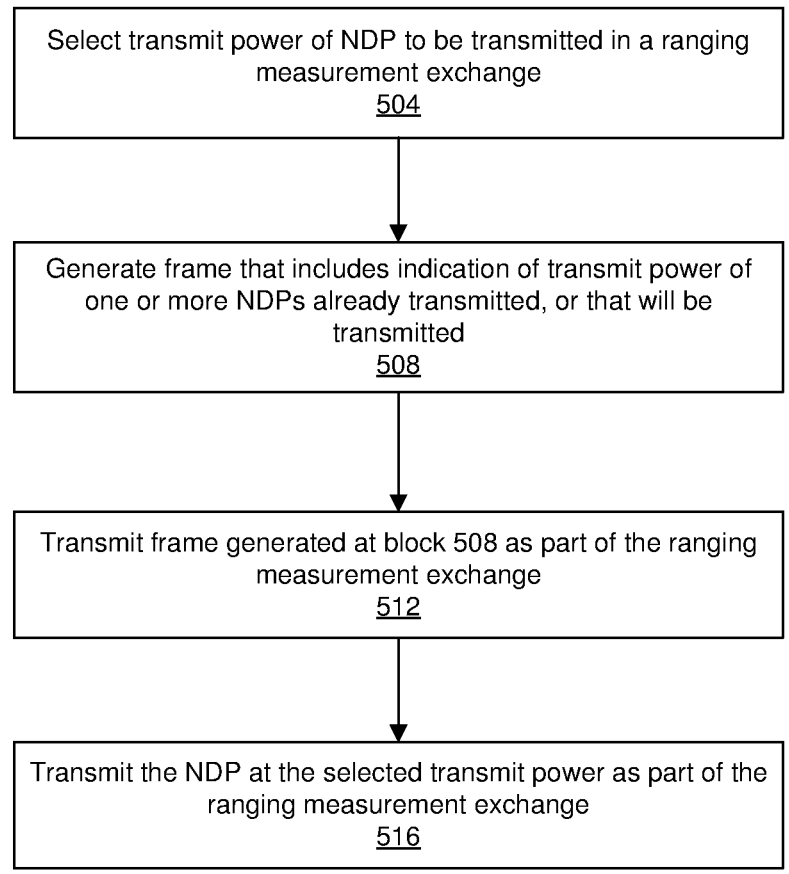
FIG. 5 is a flow diagram of an example method for performing a ranging measurement exchange in the WLAN of FIG. 1, according to an embodiment.

FIG. 5 is a flow diagram of an example method 500 for performing a ranging measurement exchange in a WLAN, according to an embodiment. In some embodiments, the client station 154-1 is configured to implement the method 500. In other embodiments, the AP 114 is configured to implement the method 500. FIG. 5 is described with reference to FIG. 1 merely for explanatory purposes, in other embodiments, the method 500 is implemented by another suitable communication device different than the AP 114 and the client station 154-1.

At block 504, a first communication device selects the network interface 162 selects, the MAC processor 166 selects, the NDP transmit power controller 194 selects, the network interface 122 selects, the MAC processor 126 selects, the NDP transmit power controller 144 selects, etc.) a transmit power of an NDP to be transmitted by the first communication device during the ranging measurement exchange. In an embodiment, selecting the transmit power at block 504 comprises using a pathloss measurement made in connection with one or more transmissions of one or more NDPs during one or more previous ranging measurement exchanges. In some embodiments, selecting the transmit power at block 504 includes using the pathloss measurement to select the transmit power to mitigate distortion caused by a transmit power amplifier of the network interface device 122/126 operating in a non-linear region.

At block 508, a first communication device generates (e.g., the network interface 162 generates, the MAC processor 166 generates, the control/management frame generator 198 generates, the network interface 122 generates, the MAC processor 126 generates, the control/management frame generator 148 generates, etc.) a frame that includes an indication of a transmit power of one or more NDPs separate from the frame to permit a second communication device to determine a pathloss between the first communication device and the second communication device based on a received power of the one or more NDPs at the second communication device. In an embodiment, the frame generated at block 508 includes an indication of a transmit power of an NDP that will be transmitted by the first communication device to the second communication device. In another embodiment, the frame generated at block 508 includes an indication of a transmit power of an NDP that was previously transmitted by the first communication device to the second communication device. In an embodiment, the frame generated at block 508 includes an indication of an average transmit power of a plurality of NDPs including a set of NDPs that were previously transmitted and optionally an NDP that will be transmitted.

In some embodiments, the frame generated at block 508 has a format such as described with reference to FIG. 3. In other embodiments, the frame generated at block 508 has a format such as described with reference to FIG. 4.

At block 512, the first communication device transmits (e.g., the network interface 162 transmits, the PHY processor 170 transmits, the network interface 122 transmits, the PHY processor 170 transmits, etc.) the frame generated at block 508 as part of the ranging measurement exchange. In an embodiment, transmitting the frame at block 512 comprises transmitting the frame within a packet.

At block 516, the first communication device transmits (e.g., the network interface 162 transmits, the PHY processor 170 transmits, the network interface 122 transmits, the PHY processor 170 transmits, etc.) the NDP at the transmit power selected at block 501 as part of the ranging measurement exchange.

In an embodiment, the frame transmitted at block 512 is an NDP announcement frame and the NDP is transmitted at block 516 after transmitting the frame at block 512. In an embodiment, transmission of the NDP at block 516 begins a defined time period (e.g., SIFS or another suitable time period) after transmission of a packet that includes the NDP announcement frame ends.

In another embodiment, the frame transmitted at block 512 is an LMR frame and the LMR frame is transmitted at block 512 after transmitting the NDP at block 516. In an embodiment, transmission of a packet that includes the LMR frame begins a defined time period (e.g., SIFS or another suitable time period) after transmission of the NDP at block 516 ends.

In some embodiments, the method 500 is modified so that the frame generated at block 508 additionally or alternatively includes an indicator of a receive power of one or more NDPs previously received by the first communication device from the second communication device. In some such embodiments, the second communication device uses the indicator of the receive power of one or more NDPs previously received by the first communication device to determine a pathloss from the second communication device to the first communication device.

In some embodiments, the method 500 is modified so that the frame generated at block 508 additionally or alternatively includes an indicator of a pathloss from the first communication device from the second communication device that was calculated by the first communication device based on NDPs exchanged between the first communication device and the second communication device. In some such embodiments, the second communication device uses the indication of the pathloss to select a transmit power to use when transmitting NDPs to the first communication device.

Figure 6:
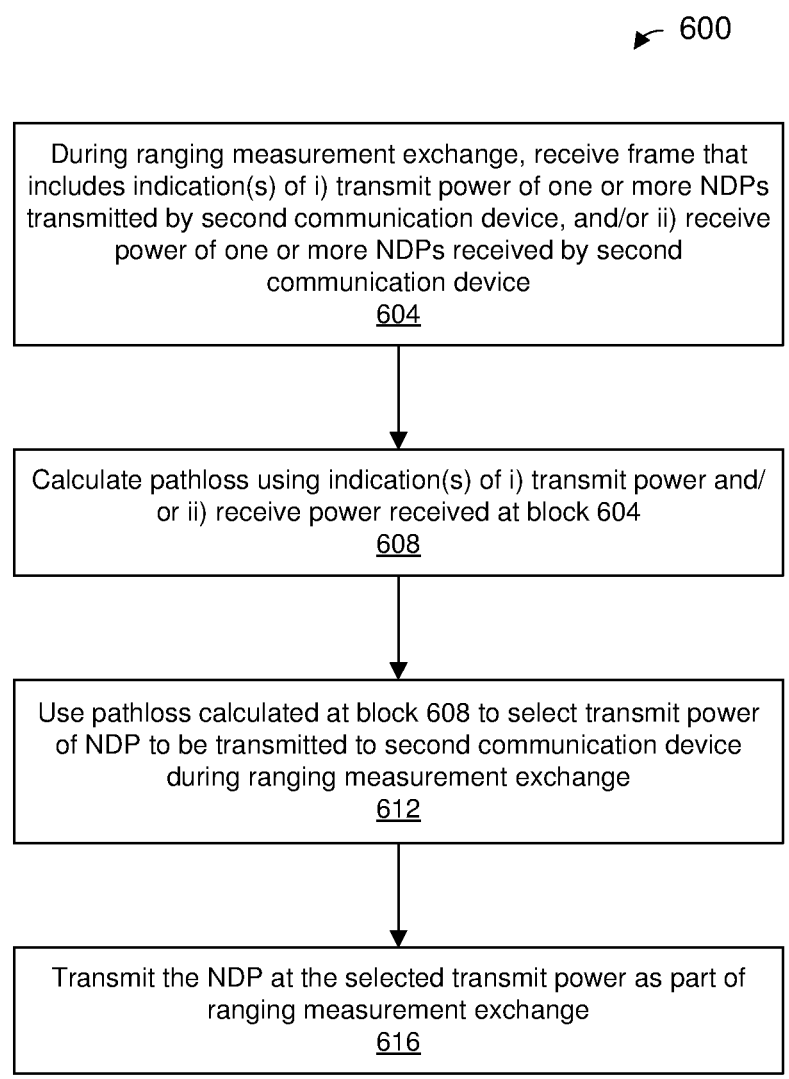
FIG. 6 is a flow diagram of another example method for performing a ranging measurement exchange in the WLAN of FIG. 1, according to another embodiment.

FIG. 6 is a flow diagram of another example method 600 for performing a ranging measurement exchange in a WLAN, according to another embodiment. In some embodiments, the AP 114 is configured to implement the method 600. In other embodiments, the client station 154-1 is configured to implement the method 600. FIG. 6 is described with reference to FIG. 1 merely for explanatory purposes. In other embodiments, the method 600 is implemented by another suitable communication device different than the AP 114 and the client station 154-1.

At block 604, a first communication device receives (e.g., the network interface 122 receives, the MAC processor 126 receives, the PHY processor 130 receives, the network interface 162 receives, the MAC processor 166 receives, the PHY processor 170 receives, etc.) a frame from a second communication device during a ranging measurement exchange with the second communication device. The frame received at block 604 includes one or more indications of i) a transmit power of one or more NDPs transmitted by the second communication device during one or more ranging measurement exchanges, and/or ii) a receive power of one or more NDPs received by second communication device during one or more ranging measurement exchanges. In an embodiment, the frame received at block 604 includes an indication of a transmit power of an NDP that will be transmitted by the second communication device to the first communication device during the same ranging measurement exchange in which the frame is received at block 604. In another embodiment, the frame received at block 604 includes an indication of a transmit power of an NDP that was transmitted by the second communication device to the first communication device during the same ranging measurement exchange in which the frame is received at block 604, or during a previous ranging measurement exchange.

In an embodiment, the frame received at block 604 includes an indication of an average transmit power of a plurality of NDPs including a set of NDPs that were previously transmitted by the second communication device in a plurality of previous ranging measurement exchanges, and optionally an NDP that was transmitted or will be transmitted during the same ranging measurement exchange in which the frame is received at block 604.

In another embodiment, the frame received at block 604 includes an indication of a receive power of an NDP that was transmitted by the first communication device to the second communication device during the same ranging measurement exchange in which the frame is received at block 604. In another embodiment, the frame received at block 604 includes an indication of a receive power of an NDP that was transmitted by the first communication device to the second communication device during a previous ranging measurement exchange.

In an embodiment, the frame received at block 604 includes an indication of an average receive power of a plurality of NDPs including a set of NDPs that were previously transmitted by the first communication device to the second communication device in a plurality of previous ranging measurement exchanges, and optionally an NDP that was transmitted by the first communication device to the second communication device during the same ranging measurement exchange in which the frame is received at block 604.

In some embodiments, the frame received at block 604 has a format such as described with reference to FIG. 3. In other embodiments, the frame received at block 604 has a format such as described with reference to FIG. 4.

At block 608, the first communication device calculates (e.g., the network interface 122 calculates, the MAC processor 126 calculates, the NDP pathloss measurement calculator 140 calculates, the network interface 162 calculates, the MAC processor 166 calculates, the NDP pathloss measurement calculator 190 calculates, etc.) a pathloss using the one or more indications of i) the transmit power of one or more NDPs, and/or ii) the receive power of one or more NDPs in the frame received at block 604.

In embodiments in which the frame received at block 604 includes an indication of transmit power of a single NDP transmitted by the second communication device, the first communication calculates (e.g., the network interface 122 calculates, the MAC processor 126 calculates, the NDP pathloss measurement calculator 140 calculates, the network interface 162 calculates, the MAC processor 166 calculates, the NDP pathloss measurement calculator 190 calculates, etc.) the pathloss using a receive power (e.g., an RSSI) of the NDP at the first communication device. In embodiments in which the frame received at block 604 includes an indication of an average transmit power of multiple NDPs transmitted by the second communication device, the first communication calculates (e.g., the network interface 122 calculates, the MAC processor 126 calculates, the NDP pathloss measurement calculator 140 calculates, the network interface 162 calculates, the MAC processor 166 calculates, the NDP pathloss measurement calculator 190 calculates, etc.) the pathloss using an average receive power (e.g., an average RSSI) of the multiple NDPs at the first communication device.

In embodiments in which the frame received at block 604 includes an indication of receive power of a single NDP transmitted by the first communication device, the first communication calculates (e.g., the network interface 122 calculates, the MAC processor 126 calculates, the NDP pathloss measurement calculator 140 calculates, the network interface 162 calculates, the MAC processor 166 calculates, the NDP pathloss measurement calculator 190 calculates, etc.) the pathloss using a transmit power of the NDP used by the first communication device. In embodiments in which the frame received at block 604 includes an indication of an average receive power of multiple NDPs transmitted by the first communication device, the first communication calculates (e.g., the network interface 122 calculates, the MAC processor 126 calculates, the NDP pathloss measurement calculator 140 calculates, the network interface 162 calculates, the MAC processor 166 calculates, the NDP pathloss measurement calculator 190 calculates, etc.) the pathloss using an average transmit power of the multiple NDPs transmitted by the first communication device.

At block 612, the first communication device uses the pathloss calculated at block 608 to select (e.g., the network interface 122 selects, the MAC processor 126 selects, the NDP transmit power controller 144 selects, the network interface 162 selects, the MAC processor 166 selects, the NDP transmit power controller 194 selects, etc.) a transmit power for an NDP to be transmitted to the second communication device during the ranging measurement exchange or a subsequent ranging measurement exchange. In some embodiments, selecting the transmit power at block 612 includes using the pathloss measurement to select the transmit power to mitigate distortion caused by a transmit power amplifier of the network interface device 122/126 operating in a non-linear region.

In some embodiments in which the frame received at block 604 includes information that indicates a request by the second communication device for the first communication device to adjust a transmit power of a next NDP to be transmitted by the first communication device, selecting the transmit power at block 612 includes further using the information that indicates the request to adjust the transmit power.

At block 616, the first communication device transmits (e.g., the network interface 162 transmits, the PHY processor 170 transmits, the network interface 122 transmits, the PHY processor 170 transmits, etc.) the NDP at the transmit power selected at block 612 as part of the ranging measurement exchange.

In an embodiment, the frame received at block 604 is an NDP announcement frame, and the pathloss is calculated at block 608 using a receive power (e.g., and RSSI) of an NDP that is transmitted by the second communication device after the NDP announcement frame is received at block 604. In an embodiment, reception of the NDP begins a defined time period (e.g., SIFS or another suitable time period) after transmission of a packet that includes the NDP announcement frame ends.

In another embodiment, the frame received at block 604 is an LMR frame and the pathloss is calculated at block 608 using a receive power (e.g., and RSSI) of an NDP that is transmitted by the second communication device prior to receiving the LMR frame received at block 604, In an embodiment, reception of a packet that includes the LMR frame begins a defined time period (e.g., SIFS or another suitable time period) after transmission of the NDP by the second communication device ends.

Figure 7:
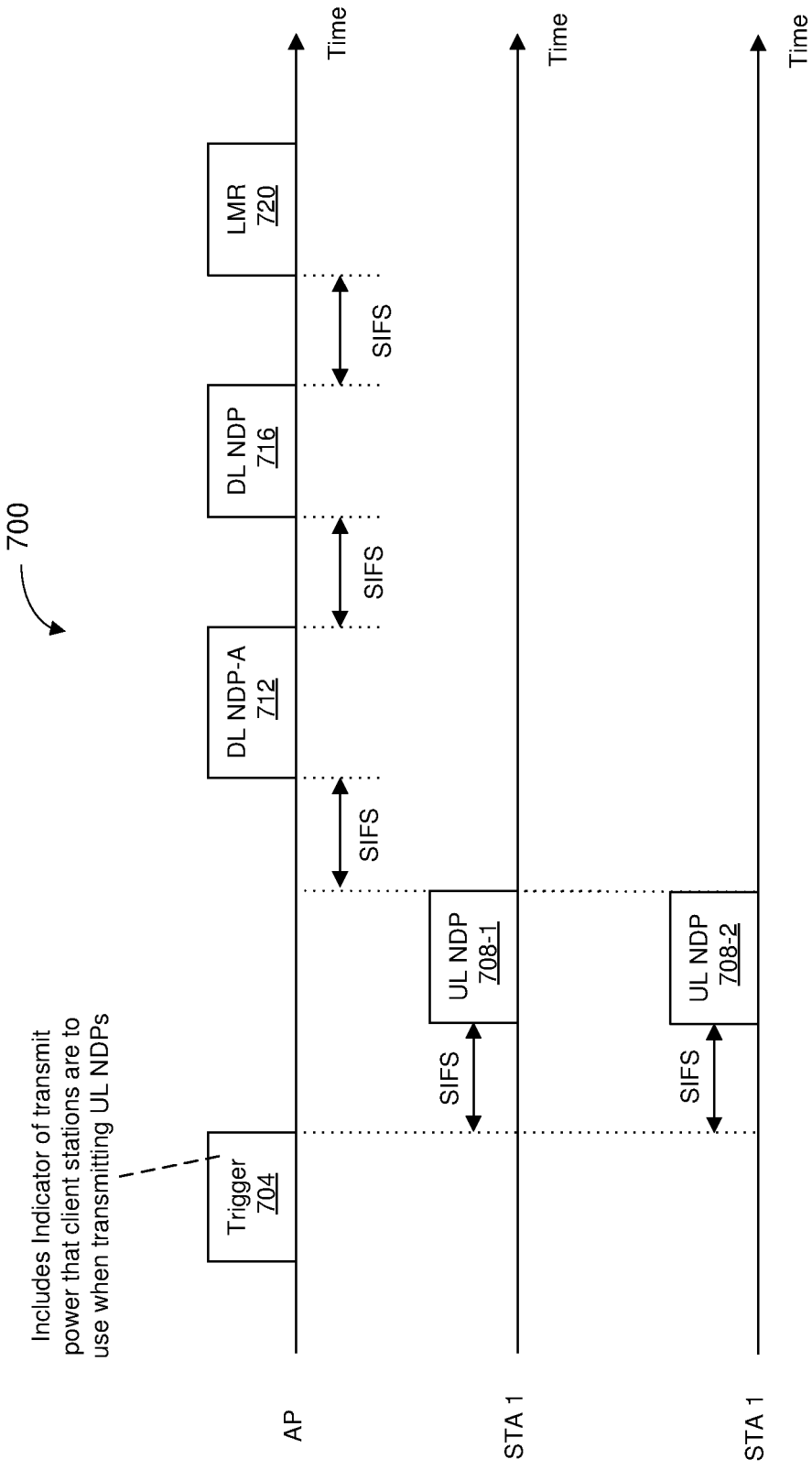
FIG. 7 is a diagram of another example ranging measurement exchange in which communication devices exchange information for calculating a pathloss between the communication devices, according to another embodiment.

FIG. 7 is a diagram of another example ranging measurement exchange 700, according to another embodiment. The ranging measurement exchange 700 is sometimes referred to as a "trigger-based ranging" measurement exchange or a "TB ranging" measurement exchange, whereas the example ranging measurement exchange 200 of FIG. 2 is sometimes referred to as a "non-TB ranging" measurement exchange. In the ranging measurement exchange 700, an AP and a plurality of client stations exchange NDPs using multiple user (MU) techniques (e.g., multi-user multiple input multiple output (MU-MIMO) techniques and/or orthogonal frequency division multiple access (OFDMA) techniques) for the purpose of respective measuring times of flight between the AP and the client stations, which can be used to estimate a respective distances between the AP and the client stations. In some embodiments, multiple instances of the ranging measurement exchange 700 are performed, and multiple measurements and/or distance estimates are combined (e.g., averaged) to determine respective estimates of the respective distances between the AP and the client stations.

In some embodiments, the AP is the AP 114 and the client stations are the client stations 154, and FIG. 7 is described in this context for explanatory purposes. In other embodiments, the AP and/or the client stations of FIG. 7 are other suitable wireless communication devices.

The AP 114 generates and transmits (e.g., the network interface device 122 generates and transmits) a trigger frame 704 that is configured to prompt a plurality of client stations 154 to simultaneously transmit uplink (UL) NDPs 708 in response to the trigger frame 704 and as part of a TB ranging measurement exchange.

In an embodiment, the trigger frame 704 includes an indicator of a transmit power that the plurality of client stations 154 are to use when transmitting the UL NDPs 708. For example, in an embodiment, the trigger frame 704 includes an uplink target RSSI field that normally is set to indicate a target receive power, at the AP 114, for uplink transmissions responsive to a trigger frame. In an embodiment, a particular value of the uplink target RSSI field is reserved to indicate a predefined (e.g., a predefined default) transmit power that client stations are to use when transmitting the UL NDPs 708. By setting the uplink target RSSI field to the particular value, the AP 114 knows the transmit power the that the client stations 154 will use when transmitting the UL NDPs 708, according to an embodiment. In other embodiments, the trigger frame 704 includes one or more fields for specifying a common transmit power that all of the client stations 154 are to use when transmitting the UL NDPs 708, or respective transmit powers that respective client stations 154 are to use when transmitting the UL NDPs 708.

Responsive to receiving the trigger frame 704, the client stations 154 simultaneously transmit the UL NDPs 708 as part of a MU transmission. In an embodiment, the trigger frame 704 is transmitted within a PHY data unit (not shown), and the client stations 154 begin to simultaneously transmit the UL NDPs 708 a predetermined time period after an end of the packet in which the trigger frame 704 is included. In an embodiment, the predetermined time period is SIFS as defined by the IEEE 802.11 Standard. In other embodiments, the predetermined time period is another suitable time period different than SIFS.

Upon receiving the UL NDPs 708, the AP 114 measures (e.g., the network interface 122 measures, the PHY processor 130 measures, etc.) respective receive powers of the UL NDPs 708 and records (e.g., the network interface 122 records, the MAC processor 126 records, the PHY processor 130 records, etc.) respective indicators (e.g., RSSIs) of the respective receive powers of the UL NDPs 708. The AP 114 uses the known transmit power of the NDPs 708 and the respective indicators of the receive powers of the NDPs 708 (e.g., RSSIs) to calculate (e.g., the network interface 122 calculates, the MAC processor 126 calculates, the NDP pathloss measurement calculator 140 calculates, etc.) respective pathlosses between the AP 114 and the client stations 154 (e.g., pathloss for client station 1=transmit power of NDP 708-1−receive power of NDP 708-1).

The AP 114 then transmits a downlink (DL) NDP-A frame 712 time that announces that the AP 114 will transmit a DL NDP 716 subsequent to the NDP-A frame 712. The AP 114 begins transmitting a packet that includes the DL NDP-A frame 712 a predetermined time period after an end of receiving the UL NDPs 708. In an embodiment, the predetermined time period is SIFS as defined by the IEEE 802.11 Standard.

The AP 114 selects (e.g., the network interface device 122 selects, the MAC processor 126 selects, the NDP transmit power controller 144 selects, etc.) a transmit power to use when transmitting a DL NDP 716. In an embodiment, the (e.g., the network interface device 122 selects, the MAC processor 126 selects, the NDP transmit power controller 144 selects, etc.) the transmit power using the pathlosses measured in response to the UL NDPs 708.

A predetermined time period after an end of transmitting the packet in which the NDP-A frame 712 is included, the AP 114 begins transmitting (e.g., the network interface device 122 begins transmitting, the PHY processor 130 begins transmitting, etc.) the DL NDP 716 at the selected transmit power. In an embodiment, the predetermined time period is SIFS as defined by the IEEE 802.11 Standard. In other embodiments, the predetermined time period is another suitable time period different than. SIFS.

A predetermined time period after an end of transmission of the DL NDP 716, the AP 114 begins transmitting (e.g., the network interface device 122 begins transmitting) an LMR frame 720. In an embodiment, the predetermined time period is SIFS as defined by the IEEE 802.11 Standard. In other embodiments, the predetermined time period is another suitable time period different than SIFS.

The LMR frame 720 includes ranging measurement information corresponding to the ranging measurement exchange 700, according to an embodiment. For example, the LMR frame 720 includes an indicator of respective times $T_2$ at which the AP 114 re received the UL NDPs 708 and an indicator of a time $T_1$ at which the AP 114 began transmitting the DL NDP 716.

The client stations 154 receive the LMR frame 720 and use the times $T_1$, $T_2$, $T_3$, and $T_4$ to calculate respective round trip times between the AP 114 and the client stations 154, according to an embodiment. The initiator receives uses the round trip time to calculate a distance between the initiator and the responder, according to an embodiment.

Figure 8:
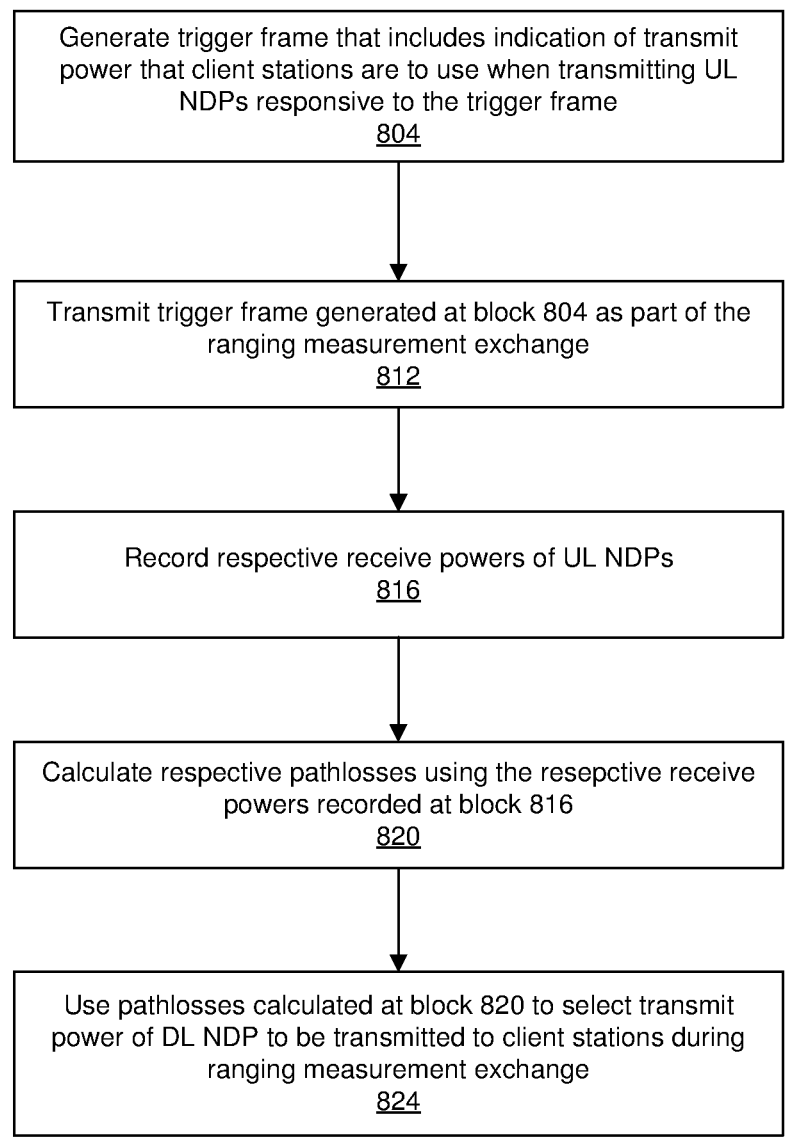
FIG. 8 is a flow diagram of another example method for performing a ranging measurement exchange in the WLAN of FIG. 1, according to another embodiment.

FIG. 8 is a flow diagram of another example method 800 for performing a ranging measurement exchange in a WLAN, according to another embodiment. In some embodiments, the AP 114 is configured to implement the method 800. FIG. 8 is described with reference to FIG. 1 merely for explanatory purposes. In other embodiments, the method 800 is implemented by another suitable communication device different than the AP 114.

At block 804, an AP generates (e.g., the network interface 122 generates, the MAC processor 126 generates, the control/management frame generator 148 generates, etc.) a trigger frame is configured to prompt a plurality of client stations 154 to simultaneously transmit UL NDPs as part of a TB ranging measurement exchange. In an embodiment, the trigger frame is generated at block 804 to that includes an indication of a transmit power that the client stations are to use when transmitting the UL NDPs that are responsive to the trigger frame.

At block 808, the AP transmits (e.g., the network interface 122 transmits, the PHY processor 130 transmits, etc.) the frame generated at block 804 as part of the ranging measurement exchange. In an embodiment, transmitting the frame at block 808 comprises transmitting the frame within a packet.

At block 816, the AP receives the UL NDPs prompted by the trigger frame and records (e.g., the network interface 122 records, the MAC processor 126 records, the PHY processor 130 records, etc.) respective receive powers (e.g., RSSIs) of the received UL NDPs.

At block 820, the AP calculates (e.g., the network interface 122 calculates, the MAC processor 126 calculates, the NDP pathloss measurement calculator 140 calculates, etc.) respective pathlosses using i) the known transmit power of the UL NDPs and ii) the receive powers (e.g., RSSIs) of the UL NDPs recorded at block 816.

At block 824, the AP uses the pathlosses calculated at block 820 to select (e.g., the network interface 122 selects, the MAC processor 126 selects, the NDP transmit power controller 144 selects, etc.) a transmit power for a DL NDP to be transmitted to the client stations during the ranging measurement exchange or a subsequent ranging measurement exchange. In some embodiments, selecting the transmit power at block 824 includes using the pathlosses calculated at block 820 to select the transmit power to mitigate distortion caused by a transmit power amplifier of the network interface device 122 operating in a non-linear region.

Although embodiments described above are in the context of performing ranging measurements, similar are techniques are used in other contexts that involve transmissions of NDPs. For example, similar techniques for calculating pathloss are used in contexts in which an NDP is transmitted to obtain a channel estimate measurement for purposes other than performing ranging measurements, such as for determining a beamforming matrix or vector, performing equalization, etc.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for performing ranging measurements in a wireless local area network (WLAN), the method comprising:

generating, at a first communication device, a frame that includes an indication of a transmit power corresponding to one or more null data packets (NDPs) separate from the frame to permit a second communication device to determine a pathloss between the first communication device and the second communication device based on a received power of the one or more NDPs at the second communication device, wherein each of the one or more NDPs includes a physical layer (PHY) header and omits a PHY data portion;

transmitting, by the first communication device, the frame as part of a ranging measurement exchange; and as part of one or more ranging measurement exchanges, transmitting, by the first communication device, the one or more NDPs in accordance with the transmit power indicated in the frame.

2. The method of claim 1, wherein:

generating the frame comprises generating an NDP announcement frame that i) announces a subsequent transmission of a subsequent NDP by the first communication device and ii) includes the indication of the transmit power of the one or more NDPs;

transmitting the frame as part of the ranging measurement exchange comprises transmitting the NDP announcement frame prior to transmitting the subsequent NDP to announce the transmission of the subsequent NDP.

3. The method of claim 2, further comprising:

selecting, at the first communication device, a transmit power for the subsequent NDP;

wherein generating the NDP announcement frame comprises generating the NDP announcement frame to include an indication of the selected transmit power of the subsequent NDP; and wherein transmitting the one or more NDPs comprises transmitting the subsequent NDP at the selected transmit power.

4. The method of claim 2, further comprising:

selecting, at the first communication device, respective transmit powers for a plurality of previous NDPs transmitted during a plurality of previous ranging measurement exchanges;

wherein generating the NDP announcement frame comprises generating the NDP announcement frame to include an indication of an average transmit power corresponding to the plurality of previous NDPs; and wherein transmitting the one or more NDPs comprises transmitting the plurality of previous NDPs at the respective transmit powers during the plurality of previous ranging measurement exchanges.

5. The method of claim 1, wherein:

generating the frame comprises generating a feedback frame that includes i) the indication of the transmit power corresponding to one or more NDPs, ii) a time of transmission of an NDP transmitted by the first communication device during the ranging measurement exchange, and iii) a time of arrival of a further NDP transmitted by the second communication device to the first communication device during the ranging measurement exchange;

transmitting the frame as part of the ranging measurement exchange comprises transmitting the feedback frame, after transmitting the NDP; to inform the second communication device of i) the transmit power of the one or more NDPs, ii) the time of transmission of the NDP, and iii) the time of arrival of the further NDP transmitted by the second communication device.

6. The method of claim 5; further comprising:

selecting, at the first communication device, a transmit power for the NDP;

wherein generating the feedback frame comprises generating the feedback frame to include an indication of the selected transmit power of the NDP; and wherein transmitting the one or inure NDPs comprises transmitting the NDP at the selected transmit power.

7. The method of claim 5, further comprising:

selecting, at the first communication device, respective transmit powers for a plurality of previous NDPs transmitted during a plurality of previous ranging measurement exchanges;

wherein generating the feedback frame comprises generating the feedback frame to include an indication of an average transmit power corresponding to the plurality of previous NDPs; and wherein transmitting the one or more NDPs comprises transmitting the plurality of previous NDPs at the respective transmit powers during the plurality of previous ranging measurement exchanges.

8. A first communication device, comprising:

a wireless network interface device that is configured to communicate in a wireless local area network (WLAN), the wireless network interface device having one or more integrated circuit (IC) devices configured to:

generate a frame that includes an indication of a transmit power corresponding to one or more null data packets (NDPs) separate from the frame to permit a second communication device to determine a pathloss between the first communication device and the second communication device based on a received power of the one or more NDPs at the second communication device, wherein each of the one or more NDPs includes a physical layer (PHY) header and omits a PI-1Y data portion, control the wireless network interface device to transmit the frame as part of a ranging measurement exchange, and as part of one or more ranging measurement exchanges, control the wireless network interface device to transmit the one or more NDPs in accordance with the transmit power indicated in the frame.

9. The first communication device of claim 8, wherein the one or more IC devices are configured to:

generate the frame as an NDP announcement frame that i) announces a subsequent transmission of a subsequent NDP by the first communication device and ii) includes the indication of the transmit power of the one or more NDPs;

control the wireless network interface device to transmit the NDP announcement frame prior to transmitting the subsequent NDP to announce the transmission of the subsequent NDP.

10. The first communication device of claim 9, wherein the one or more IC devices are further configured to:

select a transmit power for the subsequent NDP;

generate the NDP announcement frame to include an indication of the selected transmit power of the subsequent NDP; and control the wireless network interface device to transmit the subsequent NDP at the selected transmit power.

11. The first communication device of claim 9, wherein the one or more IC devices are further configured to:

select respective transmit powers for a plurality of previous NDPs transmitted during a plurality of previous ranging measurement exchanges;

generating the NDP announcement frame to include an indication of an average transmit power corresponding to the plurality of previous NDPs; and control the wireless network interface device to transmit the plurality of previous NDPs at the respective transmit powers during the plurality of previous ranging measurement exchanges.

12. The first communication device of claim 9, wherein the one or more IC devices are configured to:

generating the frame as a feedback frame that includes i) the indication of the transmit power corresponding to one or more NDPs, ii) a time of transmission of an NDP transmitted by the first communication device during the ranging measurement exchange, and iii) a time of arrival of a further NDP transmitted by the second communication device to the first communication device during the ranging measurement exchange;

control the wireless network interface device to transmit the feedback frame, after transmitting the NDP, to inform the second communication device of i) the transmit power of the one or more NDPs, ii) the time of transmission of the NDP, and iii) the time of arrival of the further NDP transmitted by the second communication device.

13. The first communication device of claim 12, wherein the one or more IC devices are further configured to:

select a transmit power for the NDP;

generate the feedback frame to include an indication of the selected transmit power of the NDP; and control the wireless network interface device to transmit the NDP at the selected transmit power.

14. The first communication device of claim 12, wherein the one or more IC devices are further configured to:

select respective transmit powers for a plurality of previous NDPs transmitted during a plurality of previous ranging measurement exchanges;

generate the feedback frame to include an indication of an average transmit power corresponding to the plurality of previous NDPs; and control the wireless network interface device to transmit the plurality of previous NDPs at the respective transmit powers during the plurality of previous ranging measurement exchanges.

15. A method for performing ranging measurements in a wireless local area network (WLAN), the method comprising:
during a ranging measurement exchange, receiving, at a first communication device, a frame that includes one or more indications of at least one of i) a transmit power corresponding to one or more first null data packets (NDPs) transmitted by a second communication device, and ii) a receive power corresponding to one or more second NDPs transmitted by the first communication device and received by the second communication device, wherein each of the one or more first NDPs and the one or more second NDPs includes a physical layer (PHY) header and omits a PHY data portion;
calculating, at the first communication device, a pathloss between the first communication device and the second communication device using the one or more indications of the at least one of i) the transmit power corresponding to one or more first NDPs, and ii) the receive power corresponding to one or more second NDPs,
using the calculated pathloss, selecting, by the first communication device, a transmit power of a first NDP to be transmitted to the first communication device; and
transmitting, by the first communication device, the first NDP at the selected transmit power as part of a ranging measurement exchange.

16. The method of claim 15, wherein:
receiving the frame that includes the one or more indications of the at least one of i) the transmit power corresponding to one or more first NDPs, and ii) the receive power corresponding to one or more second NDPs comprises receiving an NDP announcement frame that announces a subsequent transmission of a second NDP by the second communication device.

17. The method of claim 15, wherein:
receiving the frame that includes the one or more indications of the at least one of i) the transmit power corresponding to one or more first NDPs, and ii) the receive power corresponding to one or more second NDPs comprises receiving a feedback frame that includes i) a time of transmission of a second NDP transmitted by the second communication device during the ranging measurement exchange, and ii) a time of arrival of the first NDP during the ranging measurement exchange.

18. A first communication device, comprising:
a wireless network interface device that is configured to communicate in a wireless local area network (WLAN), the wireless network interface device having one or more integrated circuit (IC) devices configured to:
during a ranging measurement exchange, receive a frame that includes one or more indications of at least one of i) a transmit power corresponding to one or more first null data packets (NDPs) transmitted by a second communication device, and ii) a receive power corresponding to one or more second NDPs transmitted by the first communication device and received by the second communication device, wherein each of the one or more first NDPs and the one or more second NDPs includes a physical layer (PHY) header and omits a PHY data portion,
calculate a pathloss between the first communication device and the second communication device using the one or more indications of the at least one of i) the transmit power corresponding to one or more first NDPs, and ii) the receive power corresponding to one or more second NDPs,
using the calculated pathloss, select a transmit power of a first NDP to be transmitted to the first communication device, and
control the wireless network interface device to transmit the first NDP at the selected transmit power as part of a ranging measurement exchange.

19. The first communication device of claim 18, wherein the one or more IC devices are configured to:
receive an NDP announcement frame that announces a subsequent transmission of a second NDP by the second communication device and that includes i) the one or more indications of the at least one of i) the transmit power corresponding to one or more first NDPs, and ii) the receive power corresponding to one or more second NDPs.

20. The first communication device of claim 18, wherein the one or more devices are configured to:
receive a feedback frame that includes the one or more indications of the at least one of i) the transmit power corresponding to one or more first NDPs, and ii) the receive power corresponding to one or more second NDPs, and also includes i) a time of transmission of a second NDP transmitted by the second communication device during the ranging measurement exchange, and ii) a time of arrival of the first NDP during the ranging measurement exchange.

* * * * *